Patented Mar. 4, 1930

1,749,557

UNITED STATES PATENT OFFICE

PIERRE ALFRED BARBOU, OF PARIS, FRANCE, ASSIGNOR TO SOCIÉTÉ BARBOU & CIE., OF PARIS, FRANCE, A FRENCH CORPORATION

TREATING RESIDUAL LIQUORS ACCRUING FROM THE TREATMENT OF CELLULOSE MATERIAL

No Drawing. Application filed April 5, 1927, Serial No. 181,282, and in France April 21, 1926.

It is known that cellulose material treated at 140° C. with an aqueous solution of sodium bisulphite, is thereafter hydrolyzed to yield pure cellulose, the non-cellulose elements of the vegetable material being dissolved in the lyes in which the said material is boiled. This lixiviating method however has found no industrial use because of its high cost which is due to the circumstance that no inexpensive and simple method was hitherto available for recovering the sodium sulphite.

The present invention obviates this disadvantage by providing a process for chemically recovering the sodium sulphite used in the lixiviation process, without the necessity of preliminarily evaporating and incinerating the residual lyes.

The known principle underlying the invention is that one molecule of water reacts at 140° C. upon two molecules of lignin to yield an alcohol and an acid organic compound. It is likewise known that the acid molecule reacts upon sodium sulphite to form a sulphonated compound, the valency of the $SO_3$ group being saturated by an atom of sodium and the acid function of the organic acid formed by hydrolysis being saturated by the second atom of sodium contained in the molecule of sodium sulphite.

The residual lyes or liquors accruing from the boiling of vegetable matter with sodium sulphite contain therefore, in solution, an alcohol and a sulphonated compound with which two atoms of sodium are combined.

The sulphonated molecule is dissociated when the residual liquors are treated for example with any alkaline-earth base such as concentrated milk of lime. The $SO_3$ group fixed to this molecule combines with the lime to yield insoluble calcium sulphite while the sodium atoms combine with the hydroxyl ions of the calcium to form caustic soda. One molecule of caustic soda thus released combines with the organic molecule, the other remaining uncombined.

If now calcium bisulphite is caused to react upon the organo-sodium molecule, an insoluble organo-calcium component is formed, together with a mixture of sodium sulphite and sodium bisulphite. The bisulphite formed is neutralized by an addition of NaOH so that all the $SO_2$ and $Na_2O$ elements contained in the residual liquor are thus obtained (in solution) in the form of $Na_2SO_3$.

The process is carried into practice as follows:

1. The lye or liquor accruing from the boiling of vegetable matter with sodium sulphite is treated with lime at 75° C. in an open or closed container.

2. The mixture thus formed is pneumatically or mechanically agitated and is then allowed to stand.

3. After thus leaving the mixture for half an hour the liquid above the precipitate is drawn off and transferred to a further open or closed container.

4. The correct amount of calcium bisulphite solution is now added to the liquor. The mixture is then pneumatically or mechanically agitated for a few minutes and thereafter allowed to stand.

5. After an hour the clear supernatant liquid is drawn off and neutralized with caustic soda to obtain a solution of sodium sulphite which may be used for further lixiviating operations.

A satisfactory result is obtained only by using the reagents in accurate quantities. Adding too much lime in the course of the first operation produces, in addition to sodium sulphite, an organo-calcium compound which does not precipitate and persistently clouds the liquor. Again, adding too much calcium bisulphite causes the liquor to become over-acid, entailing the use of an undue quantity of soda for neutralization purposes.

The proportion in which the reagent is to be used is ascertained as follows:

The total amount of sodium to be recovered from the residual liquors is measured by incineration with the exclusion of air. In the course of the incinerating operation the sulphur of the sulphonated group and the atoms of sodium combined with the organic molecule, combine with one another to form sodium sulphide which is titrated by evaluation in the form of NaOH in any suitable and known way. If A is the quantity found in the form of NaOH, the amount X of $SO_2$ contained in the residual liquors is given by the formula $X = \frac{A \times 64}{80}$ since 80 grammes of sodium correspond to 64 grammes of $SO_2$. The amount of $SO_2$ being now known, and since 56 grammes of CaO combine with 64 grammes of $SO_2$, the amount Y of reaction lime is given by the formula $Y = \frac{X \times 56}{64}$, X being the quantity of $SO_2$ determined in the preceding operation.

The proportion of $SO_2$ to be added in the form of calcium bisulphite to the liquor treated with lime for sulphiting the Na elements, is ascertained as follows: The amount of Na (determined in the form of NaOH in the course of the first measurement) contained in the residual liquor, is known, and since 80 grammes of NaOH require 64 grammes of $SO_2$ to form $Na_2SO_3$, the amount Z of $SO_2$ to be added to the liquor is given by the formula $Z = \frac{A \times 64}{80}$. Knowing the total percentage of $SO_2$ contained in the calcium bisulphite solution to be used, the volume of this liquor to be placed in reaction is easily determined.

Calcium carbonate or any other alkali-earth carbonate may be used to neutralize the sulphonated group fixed to the organic molecule, but the reaction is not so complete, in that reaction equilibrium is rapidly reached between $CaCO_3$, $CO_2$ and $SO_2$, the reaction being detrimentally affected thereby.

The industrial scope of the process according to the invention covers the manufacture of cellulose for making paper or as initial material for artificial silk and artificial wool. The cost of manufacture of these materials is considerably lowered because of the recovery of chemical substances and organic matter of all kinds.

Claims:

1. A process for recovering $SO_2$ and $Na_2O$ contained in residual liquors derived from the boiling of cellulose material, comprising a treatment of the said residual liquors, accruing from the boiling of vegetable matter in a sodium sulphite solution, with an alkaline-earth base to produce caustic soda, an organo-sodium compound and an insoluble alkaline-earth metal sulphite, and treating the liquors thus obtained with a bisulphite to form a sodium sulphite, this compound being formed together with the precipitation of organic matter in the form of organo-metallic combinations corresponding to the bisulphites used.

2. A process for recovering $SO_2$ and $Na_2O$ contained in residual liquors derived from the boiling of cellulose material, comprising treating the said residual liquors, accruing from the boiling of vegetable matter in a sodium sulphite solution with an alkaline-earth base to produce caustic soda, an organo-sodium compound, an insoluble alkaline-earth metal sulphite, treating the liquors thus obtained with a bisulphite to form a sodium sulphite, this compound being formed together with the precipitation of organic matter in the form of organo-metallic combinations corresponding to the bisulphites used, and converting the insoluble alkaline-earth metal sulphite obtained into alkaline-earth metal bisulphite by treating the decantation sediment with sulphurous anhydride.

In testimony whereof I affix my signature.

PIERRE ALFRED BARBOU.